(12) United States Patent
Reedy et al.

(10) Patent No.: US 8,103,760 B2
(45) Date of Patent: Jan. 24, 2012

(54) DYNAMIC PROVISIONING OF SERVICE COMPONENTS IN A DISTRIBUTED SYSTEM

(75) Inventors: Dennis G. Reedy, Manassas, VA (US); James B. Clarke, Sanford, FL (US)

(73) Assignee: Oracle America, Inc., Redwood City, CA (US)

( * ) Notice: Subject to any disclaimer, the term of this patent is extended or adjusted under 35 U.S.C. 154(b) by 1666 days.

(21) Appl. No.: 11/213,810

(22) Filed: Aug. 30, 2005

(65) Prior Publication Data

US 2006/0010234 A1   Jan. 12, 2006

Related U.S. Application Data

(62) Division of application No. 09/947,528, filed on Sep. 7, 2001, now abandoned.

(51) Int. Cl.
*G06F 15/173* (2006.01)
(52) U.S. Cl. .................. 709/224; 709/223; 709/225
(58) Field of Classification Search .................. 709/223, 709/224, 225; 714/47.1
See application file for complete search history.

(56) References Cited

U.S. PATENT DOCUMENTS

| | | |
|---|---|---|
| 4,430,699 A | 2/1984 | Segarra et al. |
| 4,567,359 A | 1/1986 | Lockwood |
| 4,800,488 A | 1/1989 | Agrawal et al. |
| 4,992,940 A | 2/1991 | Dworkin |
| 5,101,346 A | 3/1992 | Ohtsuki |
| 5,253,165 A | 10/1993 | Leiseca et al. |
| 5,303,042 A | 4/1994 | Lewis et al. |
| 5,319,542 A | 6/1994 | King, Jr. et al. |
| 5,327,559 A | 7/1994 | Priven et al. |
| 5,339,430 A | 8/1994 | Lundin et al. |
| 5,341,477 A | 8/1994 | Pitkin et al. |
| 5,446,901 A | 8/1995 | Owicki et al. |
| 5,459,837 A | 10/1995 | Caccavale |
| 5,475,840 A | 12/1995 | Nelson et al. |
| 5,491,791 A | 2/1996 | Glowny et al. |
| 5,506,984 A | 4/1996 | Miller |
| 5,511,196 A | 4/1996 | Shackelford et al. |
| 5,544,040 A | 8/1996 | Gerbaulet |
| 5,548,724 A | 8/1996 | Akizawa et al. |
| 5,592,375 A | 1/1997 | Salmon et al. |

(Continued)

FOREIGN PATENT DOCUMENTS

WO    WO 99/17194    4/1999

(Continued)

OTHER PUBLICATIONS

Administrator's Guide, Netscape Enterprise Server, Version 3.0, Netscape Communications Corp., 1998.

(Continued)

*Primary Examiner* — Ario Etienne
*Assistant Examiner* — Sargon Nano
(74) *Attorney, Agent, or Firm* — Marsh Fischmann & Breyfogle LLP; Kent A. Lembke

(57) ABSTRACT

Systems and methods simplify the provision of complex services over a distributed network by breaking a complex service into a collection of simpler services. Systems and methods provide the tools to deconstruct a complex, provision service elements that are needed to make up the complex service, and monitor the service elements to ensure that the complex service is supported. Quality of service is provided by matching service requirements to compute resource capabilities.

6 Claims, 12 Drawing Sheets

U.S. PATENT DOCUMENTS

| | | |
|---|---|---|
| 5,644,720 A | 7/1997 | Boll et al. |
| 5,664,110 A | 9/1997 | Green et al. |
| 5,664,111 A | 9/1997 | Nahan et al. |
| 5,666,493 A | 9/1997 | Wojcik et al. |
| 5,671,279 A | 9/1997 | Elgamal |
| 5,675,797 A | 10/1997 | Chung et al. |
| 5,682,534 A | 10/1997 | Kapoor et al. |
| 5,694,551 A | 12/1997 | Doyle et al. |
| 5,710,887 A | 1/1998 | Chelliah et al. |
| 5,715,314 A | 2/1998 | Payne et al. |
| 5,721,825 A | 2/1998 | Lawson et al. |
| 5,721,832 A | 2/1998 | Westrope et al. |
| 5,724,540 A | 3/1998 | Kametani |
| 5,727,048 A | 3/1998 | Hiroshima et al. |
| 5,729,594 A | 3/1998 | Klingman |
| 5,742,768 A | 4/1998 | Gennaro et al. |
| 5,754,977 A | 5/1998 | Gardner et al. |
| 5,758,077 A | 5/1998 | Danahy et al. |
| 5,758,328 A | 5/1998 | Giovannoli |
| 5,761,507 A | 6/1998 | Govett |
| 5,764,915 A | 6/1998 | Heimsoth et al. |
| 5,774,729 A | 6/1998 | Carney et al. |
| 5,778,179 A | 7/1998 | Kanai et al. |
| 5,790,677 A | 8/1998 | Fox et al. |
| 5,794,207 A | 8/1998 | Walker et al. |
| 5,799,173 A | 8/1998 | Gossler et al. |
| 5,805,805 A | 9/1998 | Civaniar et al. |
| 5,806,042 A | 9/1998 | Kelley et al. |
| 5,809,144 A | 9/1998 | Sirbu et al. |
| 5,850,442 A | 12/1998 | Muftic |
| 5,915,112 A | 6/1999 | Boutcher |
| 5,925,108 A | 7/1999 | Johnson et al. |
| 5,961,582 A | 10/1999 | Gaines |
| 5,963,924 A | 10/1999 | Williams et al. |
| 5,978,773 A | 11/1999 | Hudetz et al. |
| 5,982,773 A | 11/1999 | Nishimura et al. |
| 5,991,808 A | 11/1999 | Broder et al. |
| 5,996,075 A | 11/1999 | Matena |
| 5,999,988 A | 12/1999 | Pelegri-Liopart et al. |
| 6,003,050 A | 12/1999 | Silver et al. |
| 6,003,065 A | 12/1999 | Yan et al. |
| 6,009,413 A | 12/1999 | Webber et al. |
| 6,009,464 A | 12/1999 | Hamilton et al. |
| 6,014,686 A | 1/2000 | Elnozahy et al. |
| 6,016,516 A | 1/2000 | Horikiri |
| 6,018,619 A | 1/2000 | Allard et al. |
| 6,032,151 A | 2/2000 | Arnold et al. |
| 6,034,925 A | 3/2000 | Wehmeyer |
| 6,044,381 A | 3/2000 | Boothby et al. |
| 6,055,562 A | 4/2000 | Devarakonda et al. |
| 6,058,381 A | 5/2000 | Nelson |
| 6,078,655 A | 6/2000 | Fahrer et al. |
| 6,092,194 A | 7/2000 | Touboul |
| 6,093,216 A | 7/2000 | Adl-Tabatabai et al. |
| 6,101,528 A | 8/2000 | Butt |
| 6,104,716 A | 8/2000 | Crichton et al. |
| 6,134,603 A | 10/2000 | Jones et al. |
| 6,154,844 A | 11/2000 | Touboul et al. |
| 6,157,960 A | 12/2000 | Kaminsky et al. |
| 6,182,083 B1 | 1/2001 | Scheifler et al. |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot et al. |
| 6,216,158 B1 | 4/2001 | Luo et al. |
| 6,219,675 B1 | 4/2001 | Pal et al. |
| 6,243,716 B1 | 6/2001 | Waldo et al. |
| 6,243,814 B1 | 6/2001 | Matena |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,272,559 B1 | 8/2001 | Jones et al. |
| 6,282,581 B1 | 8/2001 | Moore et al. |
| 6,292,934 B1 | 9/2001 | Davidson et al. |
| 6,301,613 B1 | 10/2001 | Ahlstrom et al. |
| 6,321,275 B1 | 11/2001 | McQuistan et al. |
| 6,327,677 B1 | 12/2001 | Garg et al. |
| 6,339,783 B1 | 1/2002 | Horikiri |
| 6,343,308 B1 | 1/2002 | Marchesseault |
| 6,360,266 B1 | 3/2002 | Pettus |
| 6,363,409 B1 | 3/2002 | Hart et al. |
| 6,363,411 B1 * | 3/2002 | Dugan et al. .................. 709/202 |
| 6,385,643 B1 | 5/2002 | Jacobs et al. |
| 6,408,342 B1 | 6/2002 | Moore et al. |
| 6,418,461 B1 * | 7/2002 | Barnhouse et al. ........... 709/201 |
| 6,418,468 B1 | 7/2002 | Ahlstrom et al. |
| 6,564,174 B1 | 5/2003 | Ding et al. |
| 6,578,074 B1 | 6/2003 | Bahlmann |
| 6,603,772 B1 | 8/2003 | Moussavi et al. |
| 6,604,127 B2 | 8/2003 | Murphy et al. |
| 6,604,140 B1 | 8/2003 | Beck et al. |
| 6,654,793 B1 | 11/2003 | Wollrath et al. |
| 6,704,803 B2 | 3/2004 | Wilson et al. |
| 6,757,262 B1 | 6/2004 | Weisshaar et al. |
| 6,757,729 B1 | 6/2004 | Devarakonda et al. |
| 6,779,030 B1 * | 8/2004 | Dugan et al. .................. 709/223 |
| 6,782,421 B1 * | 8/2004 | Soles et al. .................... 709/223 |
| 6,801,940 B1 | 10/2004 | Moran et al. |
| 6,801,949 B1 | 10/2004 | Bruck et al. |
| 6,804,711 B1 | 10/2004 | Dugan et al. |
| 7,024,450 B1 * | 4/2006 | Deo et al. ....................... 709/203 |
| 7,065,574 B1 * | 6/2006 | Saulpaugh et al. ........... 709/225 |
| 7,243,356 B1 * | 7/2007 | Saulpaugh et al. ........... 719/330 |
| 7,395,333 B1 * | 7/2008 | Saulpaugh et al. ........... 709/225 |
| 7,660,887 B2 * | 2/2010 | Reedy et al. .................. 709/224 |
| 7,756,969 B1 | 7/2010 | Clarke et al. |
| 8,001,232 B1 * | 8/2011 | Saulpaugh et al. ........... 709/224 |
| 2002/0059212 A1 | 5/2002 | Takagi |
| 2002/0083166 A1 * | 6/2002 | Dugan et al. .................. 709/223 |
| 2002/0091800 A1 * | 7/2002 | Wilkinson et al. ............ 709/219 |
| 2002/0105908 A1 * | 8/2002 | Blumer et al. ................. 370/230 |
| 2002/0107914 A1 * | 8/2002 | Charisius et al. ............. 709/203 |
| 2002/0111814 A1 | 8/2002 | Barnett et al. |
| 2003/0005132 A1 | 1/2003 | Nguyen et al. |
| 2003/0051029 A1 | 3/2003 | Reedy et al. |
| 2003/0120825 A1 * | 6/2003 | Avvari et al. .................. 709/316 |
| 2003/0191842 A1 | 10/2003 | Murphy et al. |
| 2009/0172091 A1 * | 7/2009 | Hamel .......................... 709/203 |

FOREIGN PATENT DOCUMENTS

| | | |
|---|---|---|
| WO | WO 01/13228 A2 | 2/2001 |
| WO | WO 01/86394 A2 | 11/2001 |
| WO | WO 01/90903 A1 | 11/2001 |

OTHER PUBLICATIONS

Almes et al., "Edmas: A Locally Distributed Mail System," Department of computer Science, University of Washington, Technical Report 83-07-01, Jul. 7, 1983, Abstract 7 pp. 1-17.

Almes et al., Research in Integrated Distributed Computing, Department of Computer Science, University of Washington, Oct. 1979, pp. 1-42.

Almes et al., "The Eden System: A Technical Review," Department of Computer Science, University of Washington, Technical Report 83-10-05, Oct. 1983, pp. 1-25.

Almes, "Integration and Distribution in the Eden System," Department of Computer Science, University of Washington, Technical Report 83-01-02, Jan. 19, 1983, pp. 1-18 & Abstract.

Almes, "The Evolution of the Eden Invocation Mechanism," Department of Computer Science, University of Washington, Technical Report 83-01-03, Jan. 19, 1983, pp. 1-14 7 Abstract.

Amitabh et al., Proxies, Application Interfaces, and Distributed Systems, IEEE, pp. 212-220, 1992.

Arnold, Ken, "The Jini Architecture: Dynamic Services in a Flexible Network," Sun Microsystems, Inc., proceedings of the 36th ACM IEEE Design Automation Conference, Jun. 1999, pp. 157-162.

Arnold K. et al., "The Jini Distributed Event Specification", The Jini Specification, Jul. 1999, pp. 155-182.

Arnold K. et al., "The Jini Lookup Service Specification", The Jini Specification, Jul. 1999, pp. 217-232.

Auto-ID Center, "Auto-ID Savant Specification 1.0," Version of Oct. 13, 2003 (58 pages).

Bandrowski, "Stores Without Doors: Kiosks Generate New Profits," Corporate Computing, Oct. 1992, pp. 193-195.
Begole et al., "Transparent Sharing of java Applets: A Replicated Approach," Oct. 1997, pp. 55-65.
Black et al., A Language for Distributed Programming, Department of Computer Science, University of Washington, Technical Report 86-02-03, Feb. 1986, p. 10.
Black et al., "Distribution and Abstract Types in Emerald," University of Washington, Technical Report 85-08-05, Aug. 1985, pp. 1-10.
Black et al., "Object Structure in the Emerald System," University of Washington, Technical Report 86-04-03, Apr. 1986, pp. 1-14.
Black et al., "The Eden Project: A Final Report," Department of Computer Science, University of Washington, Technical Report 86-11-01, Nov. 1986, pp. 1-28.
Black, "Supporting Distributed Applications: Experience with Eden," Department of Computer Science, University of Washington, Technical Report 85-03-02, Mar. 1985, pp. 1-21.
Black, "The Eden Programming Language," Department of Computer Science, FR-35, university of Washington, Technical Report 85-09-01, Sep. 1985 (Revised Dec. 1985), pp. 1-19.
Black, "The Eden Project: Overview and Experiences," Department of Computer Science, University of Washington, EUUG, Autumn '86 Conference Proceedings, Manchester, UK, Sep. 22-25, 1986, pp. 177-189.
Braine et al., "Object-Flow," 1997, pp. 418-419.
Bruno, "Working the Web," Data Communications, Apr. 1997, pp. 50-60.
Chan, P. et al., *The Java Class Libraries, 2nd Edition*, vol. 1, "Java.io ObjectInputStream," XP-002243027, pp. 1230-1232, and 1283, Mar. 9, 1998 (7 pages).
Ciancarini et al., "Coordinating Distributed Applets with Shade/Java," Feb. 1998, pp. 130-138.
Cohen, "Electronic Commerce," USC/Information Sciences Institute, Oct. 1989.
Conhaim, "Online shopping: a beginner's guide; includes related listing of videotex services," Link-Up, vol. 5, No. 6, p. 32, Nov. 1988.
"Consumers Can View, Share Picture On-Line as Kodak Picture Network Goes 'Live'," Business Wire, Aug. 25, 1997, pp. 18-19.
Delcambre et al., "Simulation of the Object Flow Model: A Conceptual Modeling Language for Object-Driven Applications," 1993, pp. 216-225.
Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.
Douglas Hodges, "Managing Object Lifetimes in OLE"; Aug. 25, 1994, pp. 1-41.
"Eden Project Proposal," Department of Computer Science, University of Washington, Oct. 1980, Technical Report #80-10-01, cover and Foreword.
Ellsworth, "Boom Town," Internet World, Jun. 1995, pp. 33-35.
Estrin, "Inter-Organization Networks: Implications of Access Control Requirements for Interconnection Protocols," ACM, 1986, pp. 254-263.
Fleischer, "SkyMall's 'Supplier Network' Takes Flight", Retailtech, The Technology Magazine for Retail Executives, Apr. 1997.
Foley, "Managing Campus-Wide Information Systems: Issues and Problems," Capitalizing on Communication, ACM SIGUCCS XVII, 1989, pp. 169-174.
Fryxell, "eaasySABRE," Link-Up, May/Jun. 1996, pp. 10-11.
Gardner, "Kodak Follows Startup Into Online Photo Processing Business," Internet World, Sep. 8, 1997, pp. 5-6.
Gogan et al., "Open Market, Inc.: Managing in a Turbulent Environment," Harvard Business School Publishing, Aug. 29, 1996, pp. 1-30.
Goldberg et al., "Smalltalk-80—The Language and its Implementation," Xerox Palo Alto Research Center, 1983 (reprinted with corrections, Jul. 1985), pp. 1-720.
H.A. Smith and J.D. McKeen, "Object-Oriented Technology: Getting beyond the Hype," ACM, Spring 1996, vol. 27, pp. 20-29.
Holman et al., "The Eden Shared Calendar System," Department of Computer Science, FR-35, University of Washington, Technical Report 85-05-02, Jun. 22, 1985, pp. 1-14.
Hsu, "Reimplementing Remote Procedure Calls," University of Washington, Thesis, Mar. 22, 1985, pp. 1-106.
Hutchinson, "Emerald: An Object-Based Language for Distributed Programming," a Dissertation, University of Washington, 1987, pp. 1-107.
"ISN Dataweb Sells Software, Hardware," Datamation, Apr. 1, 1996, p. 40.
Israel et al., "Authentication in Office System Internetworks," ACM Transactions on Office Information Systems, vol. 1, No. 3, Jul. 1983, pp. 193-210.
Jacob, "The Use of Distributed Objects and Dynamic Interfaces in a Wide-Area Transaction Environment," SIGCOMMn '95 Workshop on Middleware: Cambridge, Mass., Aug. 1995, pp. 1-3.
Java Remote Method Invocation Specification, JDK 1.1 FCS, Sun Microsystems, inc. Feb. 1997, chapters 5 and 7.
"Java™ Object Serialization Specification," Sun Microsystems, Inc., XP-002242372, <www.dei.estg.iplei.pt/P3/N/material/extra/serial-spec-JDK1_2.pdf?, Nov. 30, 1998 (76 pages).
Jennings, N.R. et al., "Using Intelligent Agents to Manage Business Processes," Dept. Electronic Engineering, Queen Mary & Westfield College, Mile End Road, London, E1 4NS, U.K., XP-002254546, 1996 (pp. 345-360).
Jul et al., "Fine-Grained Mobility in the Emerald System," University of Washington, ACM Transactions on Computer Systems, vol. 6, No. 1, Feb. 1988, pp. 109-133.
Jul, "Object Mobility in a Distributed Object-Oriented System," a Dissertation, University of Washington, 1989, pp. 1-154 (1 page Vita).
Keller, "Smart Catalogs and Virtual Catalogs," Proceedings of the First USENIX Workshop of Electronic Commerce, USENIX Association, Jul. 11-12, 1995, pp. 125-131.
Klein et al., "Trade'ex: The Stock Exchange of the Computer Industry," Harvard Business School Publishing, 1996, pp. 1-14.
"Kodak DC220 and DC260 Digital Cameras Are Shipping to Retailers Across the Country Cameras Art Optimized for USB Interface Supported in Windows 98," Business Wire, Jun. 24, 1998, pp. 42-44.
"Kodak demonstrates leadership across entire photographic category," M2 Presswire, Feb. 13, 1998, pp. 31-35.
"Kodak PhotoNet Online Makes It a Snap to Share Summer Photos," PR Newswire, Jul. 2, 1998, pp. 63-64.
Kodak Photonet FAQ, PhotoNet Online, Jun. 14, 2002, pp. 1-3.
"Kodak Picture Network Sends Prints Home From the Holidays," Business Wire, Dec. 29, 1997, pp. 58-60.
Kolodner et al., "Atomic garbage collection: Managing a Stable Heap," ACM, 1989, pp. 15-25.
Koshizuka et al., "Window Real-Objects: A Distributed Shared memory for Distributed Implementation of GUI Applications," Nov. 1993, pp. 237-247.
Kramer, "Netwatch; The AJC's Daily Online Guide; Get the picture: Kodak will send photos to Web," The Atlanta Journal and Constitution, Sec. Features, p. 08C, Jun. 5, 1997.
Krasner et al., "Smalltalk-80: Bits of history, Words of Advice," 1983, Xerox Corporation, pp. 1-344.
Lampson et al., "Authentication in Distributed Systems: Theory and Practice," ACM Transactions n Computer Systems, vol. 10, No. 4, Nov. 1992, pp. 265-310.
Lansky, "Without APS, Photo Life Goes on Via Internet," Photographic Trade News, Aug. 1996, pp. 19-23.
Lavana et al., "Executable Workflows: A Paradigm for Collaborative Design on the Internet," Jun. 1997, 6 pages.
Lewis, "Pacific Bell, MCI to Expand Internet Service," The New York Times, sec. D, col. 1 at 3, Mar. 28, 1995.
LightSurf Instant Imaging—Press Releases, "Kodak and LightSurf Collaborate on Kodak Picture Center Online," LifeSurf Technologies Inc., Jun. 14, 2002, pp. 1-3.
Louwerse et al., "Data Protection Aspects in an Integrated Hospital Information System," North-Holland Computers & Security 3, 1984, pp. 286-294.
McEnaney, "Point-and-Click Memory Sharing; Launches PhotoNet online digital photography and imaging services," Photographic Trade News, Sec. p. 23, Jan. 1997.
Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184-201.

O'Mahony, "Security Considerations in a Network Management Environment," IEEE Network, May/Jun. 1994, pp. 12-17.

Oppen et al., "The Clearinghouse: A Decentralized Agent for Locating Names Objects in a Distributed Environment," ACM Transactions on Office Information Systems, vol. 1, No. 3, Jul. 1983, pp. 230-253.

Opyrchal et al., "Efficient Object Serialization in java," Department of Electrical Engineering and Computer Science, University of Michigan, XP-002242373, May 31, 1999 (6 pages).

Osborn, "The Role of Polymorphism in Schema Evolution in an Object-Oriented Database," IEEE Transactions on Knowledge and Data Engineering, vol. 1, No. 3, Sep. 1989, pp. 310, 317.

Petersen, "New But Not Improved," Direct Magazine, Nov. 1995.

"Photo processing made easy on the Internet; Storm Software and PicturVision team up with Konica Corp.," Business Wire, Feb. 22, 1996, pp. 3-4.

Press Release, "Sun Goes Live With the Kodak Picture Network," Sun Microsystems, Inc., Jun. 14, 2002, pp. 1-2.

Proceedings of the Eighth Symposium on Operating Systems Principles, Dec. 14-16, 1981, ACM, Special Interest Group on Operating Systems, Association for Computing Machinery, vol. 15, No. 5, Dec. 1981, ACM order No. 534810.

Proudfoot, "Replects: Data Replication in the Eden System," Department of Computer Science, University of Washington, Technical Report No. TR-85-12-04, Dec. 1985, pp. 1-156.

Pu, "Replication and Nested Transaction in the Eden Distributed System," Doctoral Dissertation, University of Washington, Aug. 6, 1986, pp. 1-179 (1 page Vita).

Raeder, "Is there a Prodigy in your future?," Database Searcher, vol. 5, No. 6, p. 18.

Ramm et al., "Exu—A System for Secure Delegation of Authority on an Insecure Network," Ninth System Administration Conference, 1995 LISA IX, Sep. 17-22, 1995, pp. 89-93.

Satyanarayanan, "Integrating Security in a Large Distributed System," ACM Transactions on Computer Systems, vol. 7, No. 3, Aug. 1989, pp. 247-280.

Schroeder et al., "Experience with Grapevine: The Growth of a Distributed System," ACM Transactions on Computer Systems, vol. 2, No. 1, Feb. 1984, pp. 3-23.

"Seeing your photos a whole new way," Business Wire, Dec. 12, 1996, pp. 9-10.

Senn, "Capitalizing on Electronic Commerce: The Role of the Internet in Electronic Markets," Information Systems Management, Summer 1996, pp. 15-24.

Steinke, "Design Aspects of Access Control in a Knowledge Base System," Computers & Security, 10, 1991, pp. 612-625.

Stern, "Industry Net," Link-Up, Mar./Apr. 1995, p. 10.

Tanenbaum et al., "Distributed Operating Systems," Computing Surveys, vol. 17, No. 4, Dec. 1985, pp. 419-470.

The Wall Street Journal, "Barclays Is Opening an 'Electronic Mall' for Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trehan et al., "Toolkit for Shared Hypermedia on a Distributed Object Oriented Architecture," 1993, pp. 1-8.

Trommer, "Thomas Unveils Online Purchasing Network—Eases Product Sourcing and Ordering Through EDI," Electronic Buyers' News at 60, Dec. 11, 1995.

Van Den Berg et al., "Advanced Topics of a Computer Center Audit," North-Holland Computers & Security 3, 1984, pp. 171-185.

Van Der Lans, "Data Security in a Relational Database Environment," North-Holland Computers & Security 5, 1986, pp. 128-134.

"Webwatch: MCI Announces Internet Access,", Boardwatch Magazine, Jan. 1995.

Welz, "New Deals: A ripening Internet market, secure systems and digital currency are reshaping global commerce," Internet World, Jun. 1995, pp. 36-41.

Wobber et al., "Authentication in the Taos Operating System," ACM, 1993, pp. 256-269.

Wollrath et al., "JAVA-Centric Distributed Computing," IEEE Micro May/Jun. 1997, pp. 44-53.

Wyatt, "Netscape Enterprise Server," Prima Publishing, 1996.

Final Office Action dated Jun. 3, 2005, U.S. Appl. No. 09/947,528, nine pages.

Li, Sing, "Professional Jini," Chapter 7, Aug. 2000, Wrox Press, Inc. ISBN: 1861003552.

Spiteri, M. D., et al., "An Architecture to Support Storage and Retrieval of Events," 1998, Springer-Verlag Long Limited 1998, IFIP International Conference on Distributed Systems Platforms and Open Distributed Processing, Lancaster, UK, Sep. 1998.

* cited by examiner

DYNAMIC PROVISIONING OF SERVICE COMPONENTS IN A DISTRIBUTED SYSTEM

RELATED APPLICATIONS

This application is a divisional of U.S. patent application Ser. No. 09/947,528, filed Sep. 7, 2001 now abandoned, which is incorporated by reference. This application is related to U.S. patent application Ser. No. 09/947,549, entitled Distributed Metric Discovery and Collection in a Distributed System, filed Sep. 7, 2001, which is relied upon and incorporated by reference.

FIELD OF THE INVENTION

This invention relates to providing services in a distributed system and, more particularly, to methods and systems for dynamically provisioning services according to software requirements and compute resource capabilities.

BACKGROUND OF THE INVENTION

Distributed systems today enable a device connected to a communications network to take advantage of services available on other devices located throughout the network. Each device in a distributed system may have its own internal data types, its own address alignment rules, and its own operating system. To enable such heterogeneous devices to communicate and interact successfully, developers of distributed systems can employ a remote procedure call (RPC) communication mechanism.

RPC mechanisms provide communication between processes (e.g., programs, applets, etc.) running on the same device or different devices. In a simple case, one process, i.e., a client, sends a message to another process, i.e., a server. The server processes the message and, in some cases, returns a response to the client. In many systems, the client and server do not have to be synchronized. That is, the client may transmit the message and then begin a new activity, or the server may buffer the incoming message until the server is ready to process the message.

The Java™ programming language is an object-oriented programming language that may be used to implement such a distributed system. The Java™ language is compiled into a platform-independent format, using a bytecode instruction set, which can be executed on any platform supporting the Java™ virtual machine (JVM). The JVM may be implemented on any type of platform, greatly increasing the ease with which heterogeneous machines can be federated into a distributed system.

The Jini™ architecture has been developed using the Java™ programming language to enable devices in a distributed system to share services using remote method invocation (RMI). Traditional Jini™ systems use RMI to enable a client device to request and receive a service provided by a server device on a remote machine. While conventional Jini™ systems provide a basic architecture for providing services in a distributed system, they do not provide tools specifically directed to providing complex services. Current systems do not address provisioning a service, such as application software, to make it available to the distributed system in the first place. Furthermore, conventional systems do not consider the requirements of a specific service before provisioning the service to make it available in the distributed system.

SUMMARY OF THE INVENTION

Methods and systems consistent with the present invention provide a service in a distributed system, the service consisting of a collection of service elements. It is determined whether an instance of each service element in the collection is running in the distributed system. For each service element in the collection that does not have an instance running in the distributed system, a new service element instance is created.

In accordance with an aspect of the invention, a system facilitates providing a service in a distributed system. A list of service elements that together constitute the service is received. For each service element in the list, it is discovered whether an application corresponding to the service element is running in the distributed system. The application corresponding to the service element is created, if the application corresponding to the service element is not running in the distributed system. The application is monitored to detect whether the application fails.

According to the present invention, a method handles events in a distributed system. A capability to notify members of the distributed system when an event of a predetermined type occurs is advertised. Registration requests are received from a plurality of event consumers, the registration requests specifying the predetermined type. When an event of the predetermined type occurs, an order is determined in which to notify each of the plurality of event consumers, and an event notification is sent to each of the plurality of event consumers in the order determined.

Additional features of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DETAILED DESCRIPTION

The following description of embodiments of this invention refers to the accompanying drawings. Where appropriate, the same reference numbers in different drawings refer to the same or similar elements.

A. Introduction

Systems consistent with the present invention simplify the provision of complex services over a distributed network by breaking a complex service into a collection of simpler services. For example, automobiles today incorporate complex computer systems to provide in-vehicle navigation, entertainment, and diagnostics. These systems are usually federated into a distributed system that may include wireless connections to a satellite, the Internet, etc. Any one of an automobile's systems can be viewed as a complex service that can in turn be viewed as a collection of simpler services.

A car's overall diagnostic system, for example, may be broken down into diagnostic monitoring of fluids, such as oil pressure and brake fluid, and diagnostic monitoring of the electrical system, such as lights and fuses. The diagnostic monitoring of fluids could then be further divided into a process that monitors oil pressure, another process that monitors brake fluid, etc. Furthermore, additional diagnostic areas, such as drive train or engine, may be added over the life of the car.

Systems consistent with the present invention provide the tools to deconstruct a complex service into service elements, provision service elements that are needed to make up the complex service, and monitor the service elements to ensure that the complex service is supported. One embodiment of the present invention can be implemented using the Rio architecture created by Sun Microsystems and described in greater detail below. Rio uses tools provided by the Jini™ architecture, such as discovery and event handling, to provision and monitor complex services in a distributed system.

Figure 1:
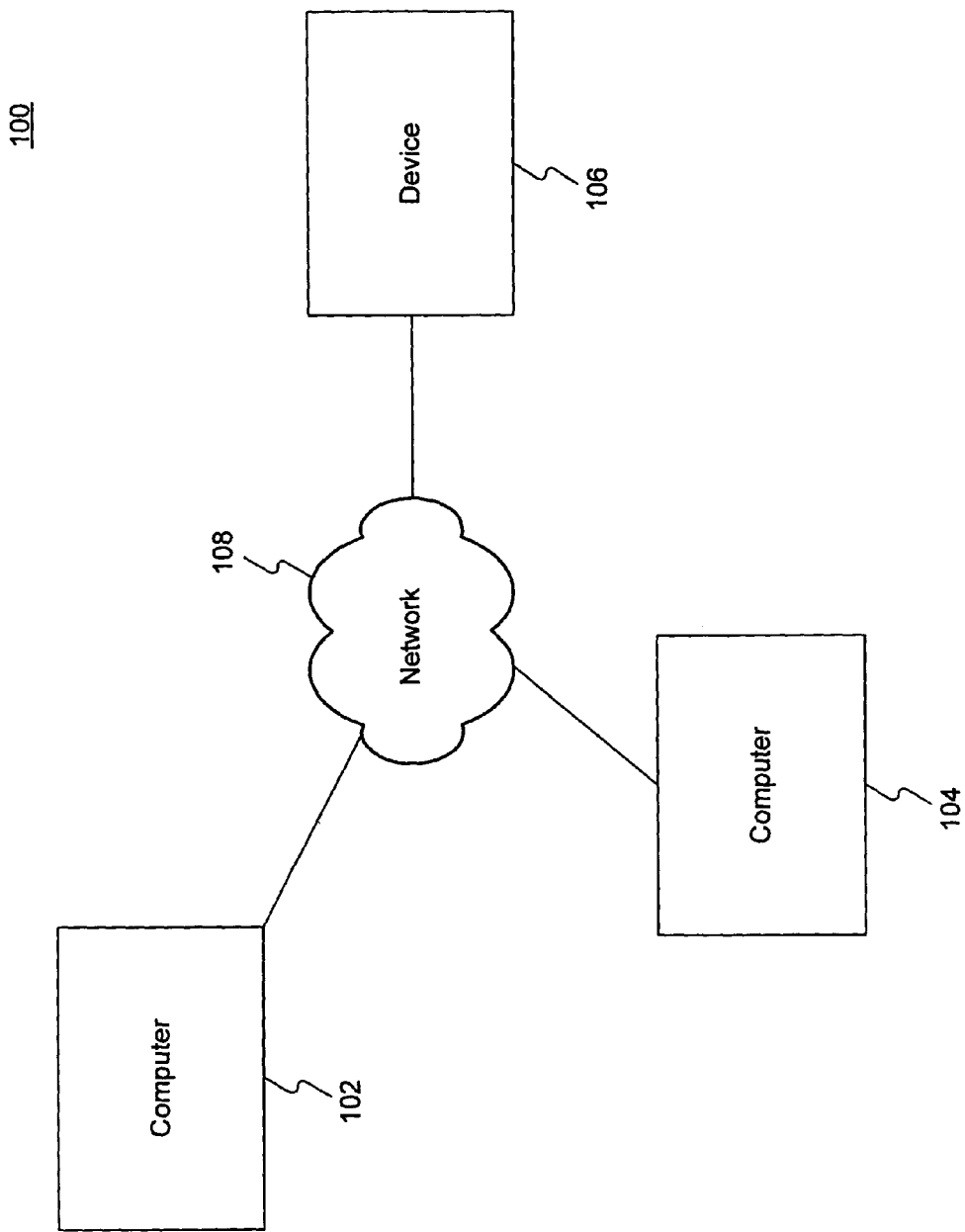
FIG. 1 is a high level block diagram of an exemplary system for practicing systems and methods consistent with the present invention.

FIG. 1 is a high level block diagram of an exemplary distributed system consistent with the present invention. FIG. 1 depicts a distributed system 100 that includes computers 102 and 104 and a device 106 communicating via a network 108. Computers 102 and 104 can use any type of computing platform. Device 106 may be any of a number of devices, such as a printer, fax machine, storage device, or computer. Network 108 may be, for example, a local area network, wide area network, or the Internet. Although only two computers and one device are depicted in distributed system 100, one skilled in the art will appreciate that distributed system 100 may include additional computers and/or devices.

The computers and devices of distributed system 100 provide services to one another. A "service" is a resource, data, or functionality that can be accessed by a user, program, device, or another service. Typical services include devices, such as printers, displays, and disks; software, such as programs or utilities; and information managers, such as databases and file systems. These services may appear programmatically as objects of the Java™ programming environment and may include other objects, software components written in different programming languages, or hardware devices. As such, a service typically has an interface defining the operations that can be requested of that service.

Figure 2:
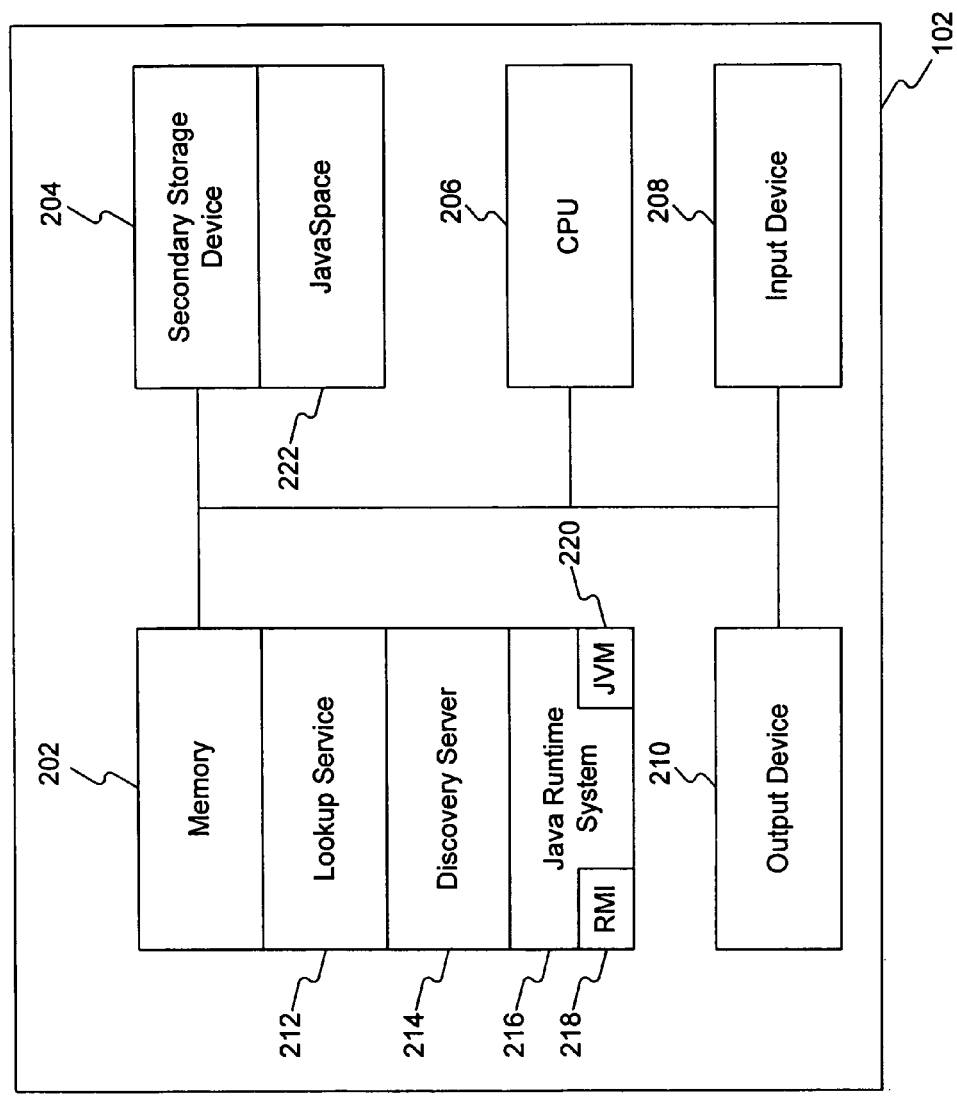
FIG. 2 depicts a computer in greater detail to show a number of the software components of an exemplary distributed system consistent with the present invention.

FIG. 2 depicts computer 102 in greater detail to show a number of the software components of distributed system 100. One skilled in the art will recognize that computer 104 and device 106 could be similarly configured. Computer 102 contains a memory 202, a secondary storage device 204, a central processing unit (CPU) 206, an input device 208, and output device 210. Memory 202 includes a look-up service 212, a discovery server 214, and a Java™ runtime system 216. Java™ runtime system 216 includes Remote Method Invocation (RMI) process 218 and Java™ virtual machine (JVM) 220. Secondary storage device 204 includes a Java™ space 222.

Memory 202 can be, for example, a random access memory. Secondary storage device 204 can be, for example, a CD-ROM. CPU 206 can support any platform compatible with JVM 220. Input device 208 can be, for example, a keyboard or mouse. Output device 210 can be, for example, a printer.

JVM 220 acts like an abstract computing machine, receiving instructions from programs in the form of bytecodes and interpreting these bytecodes by dynamically converting them into a form for execution, such as object code, and executing them. RMI 218 facilitates remote method invocation by allowing objects executing on one computer or device to invoke methods of an object on another computer or device. Lookup Service 212 and Discovery Server 214 are described in great detail below. Java™ space 222 is an object repository used by programs within distributed system 100 to store objects. Programs use Java space 222 to store objects persistently as well as to make them accessible to other devices within distributed system 100.

A. The Jini™ Environment

The Jini™ environment enables users to build and maintain a network of services running on computers and devices. Jini™ is an architectural framework provided by Sun Microsystems that provides an infrastructure for creating a flexible distributed system. In particular, the Jini™ architecture enables users to build and maintain a network of services on computers and/or devices. The Jini™ architecture includes Lookup Service 212 and Discovery Server 214 that enable services on the network to find other services and establish communications directly with those services.

Lookup Service 212 defines the services that are available in distributed system 100. Lookup Service 212 contains one object for each service within the system, and each object contains various methods that facilitate access to the corresponding service. Discovery Server 214 detects when a new device is added to distributed system 100 during a process known as boot and join, or discovery. When a new device is detected, Discovery Server 214 passes a reference to the new device to Lookup Service 212. The new device may then register its services with Lookup Service 212, making the device's services available to others in distributed system 100. One skilled in the art will appreciate that exemplary distributed system 100 may contain many Lookup Services and Discovery Servers.

Figure 3:
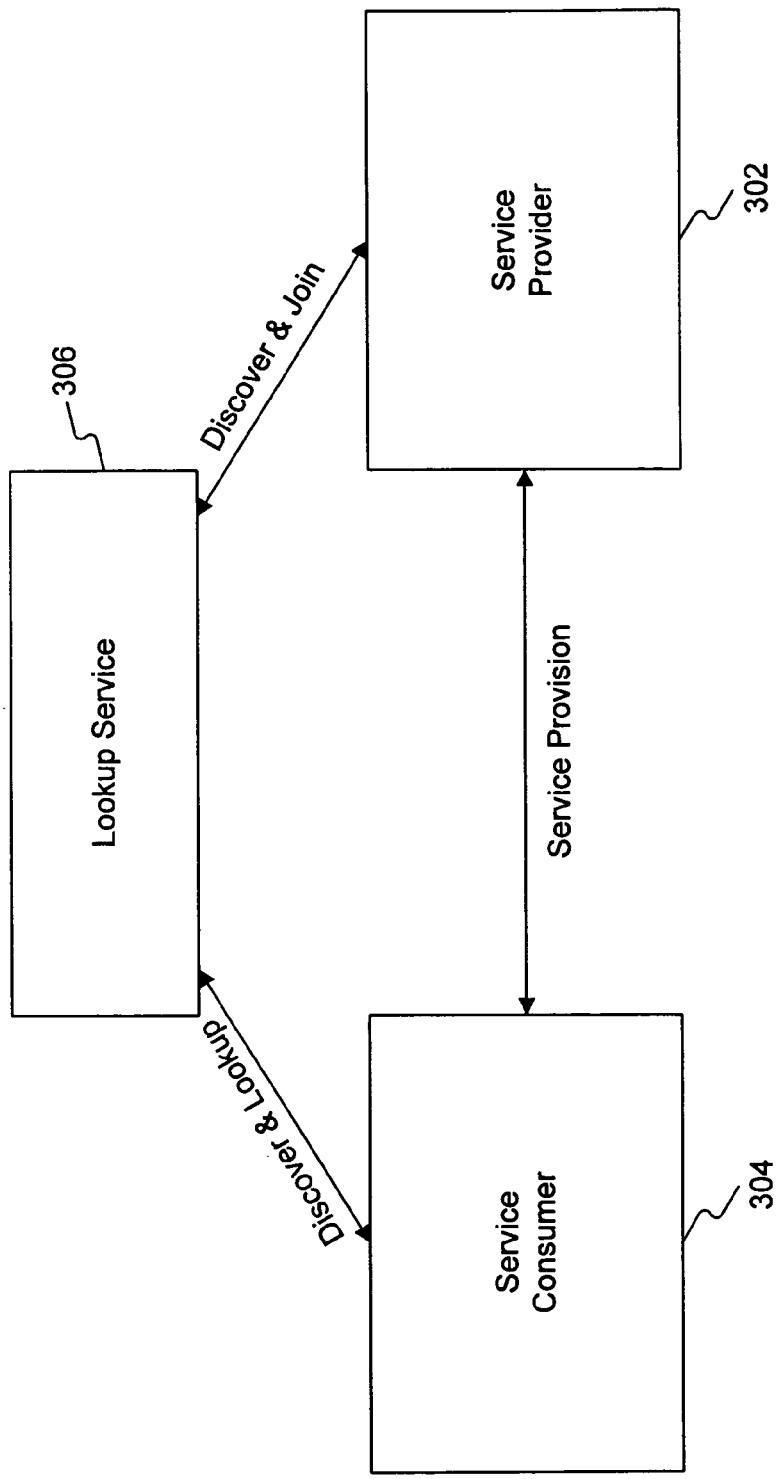
FIG. 3 depicts an embodiment of the discovery process in more detail, in accordance with the present invention.

FIG. 3 depicts an embodiment of the discovery process in more detail. This process involves a service provider 302, a service consumer 304, and a lookup service 306. One skilled in the art will recognize that service provider 302, service consumer 304, and lookup service 306 may be objects running on computer 102, computer 104, or device 106.

As described above, service provider 302 discovers and joins lookup service 306, making the services provided by service provider 302 available to other computers and devices in the distributed system. When service consumer 304 requires a service, it discovers lookup service 306 and sends a lookup request specifying the needed service to lookup service 306. In response, lookup service 306 returns a proxy that corresponds to service provider 302 to service consumer 304. The proxy enables service consumer 304 to establish contact directly with service provider 302. Service provider 302 is then able to provide the service to service consumer 304 as needed. An implementation of the lookup service is explained in "The Jini™ Lookup Service Specification," contained in Arnold et al., *The Jini™ Specification*, Addison-Wesley, 1999, pp. 217-231.

Distributed systems that use the Jini™ architecture often communicate via an event handling process that allows an object running on one Java™ virtual machine (i.e., an event consumer or event listener) to register interest in an event that occurs in an object running on another Java™ virtual machine (i.e., an event generator or event producer). An event can be, for example, a change in the state of the event producer. When the event occurs, the event consumer is notified. This notification can be provided by, for example, the event producer.

Figure 4:
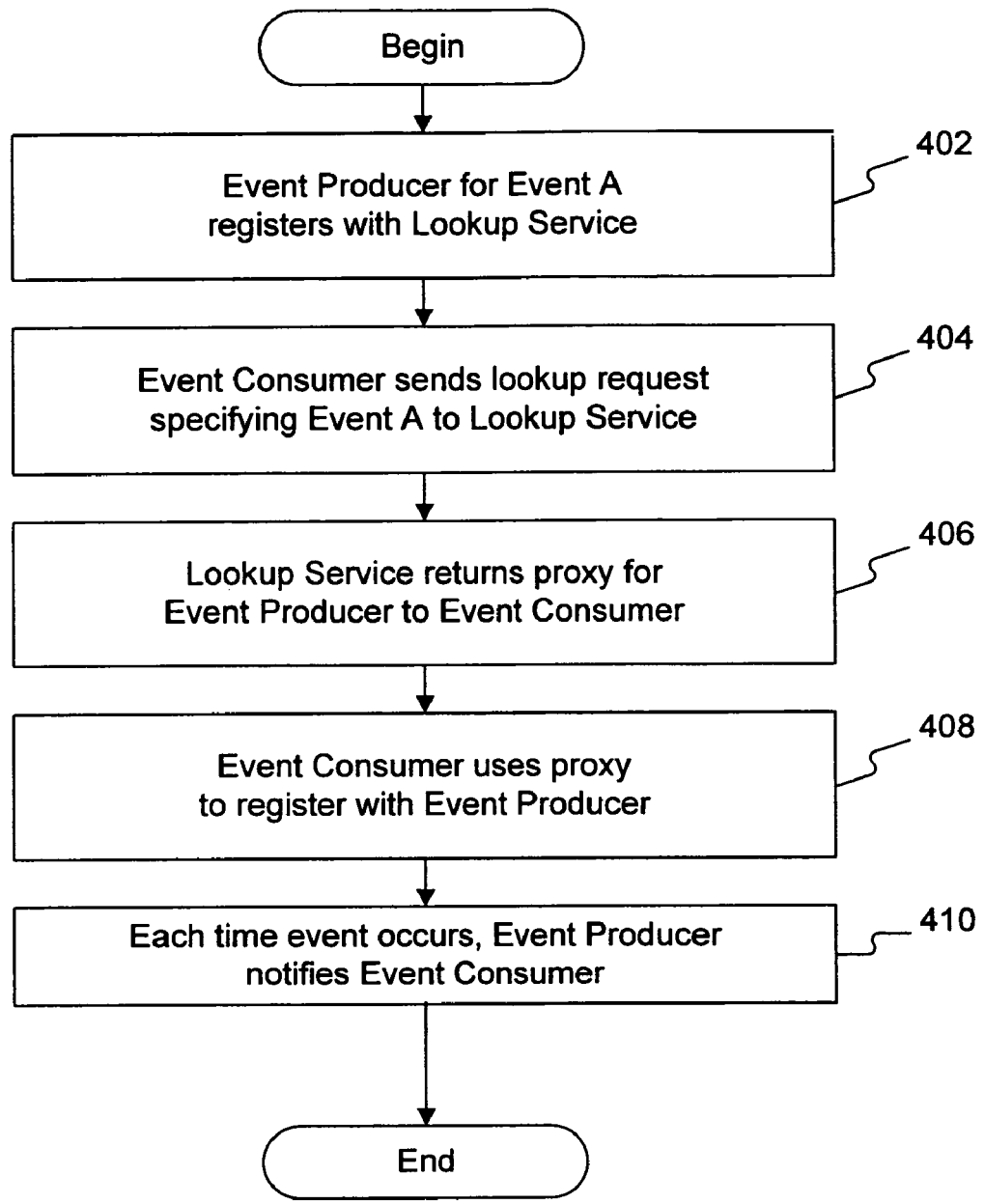
FIG. 4 is a flow chart of an embodiment of the event handling process, in accordance with the present invention.

FIG. 4 is a flow chart of one embodiment of the event handling process. An event producer that produces event A registers with a lookup service (step 402). When an event consumer sends a lookup request specifying event A to the lookup service (step 404), the lookup service returns a proxy for the event producer for event A to the event consumer (step 406). The event consumer uses the proxy to register with the event producer (step 408). Each time the event occurs thereafter, the event producer notifies the event consumer (step 410). An implementation of Jini™ event handling is explained in "The Jini™ Distributed Event Specification," contained in Arnold et al., *The Jini™ Specification*, Addison-Wesley, 1999, pp. 155-182.

B. Overview of Rio Architecture

The Rio architecture enhances the basic Jini™ architecture to provision service elements. To provide the complex service, the Rio architecture instantiates and monitors a service instance corresponding to each service element. A service element might correspond to, for example, an application service or an infrastructure service. In general, an application service is developed to solve a specific application problem, such as word processing or spreadsheet management. An infrastructure service, such as the Jini™ lookup service, provides the building blocks on which application services can be used. One implementation of the Jini lookup service is described in U.S. Pat. No. 6,185,611, for "Dynamic Lookup Service in a Distributed System."

Figure 5:
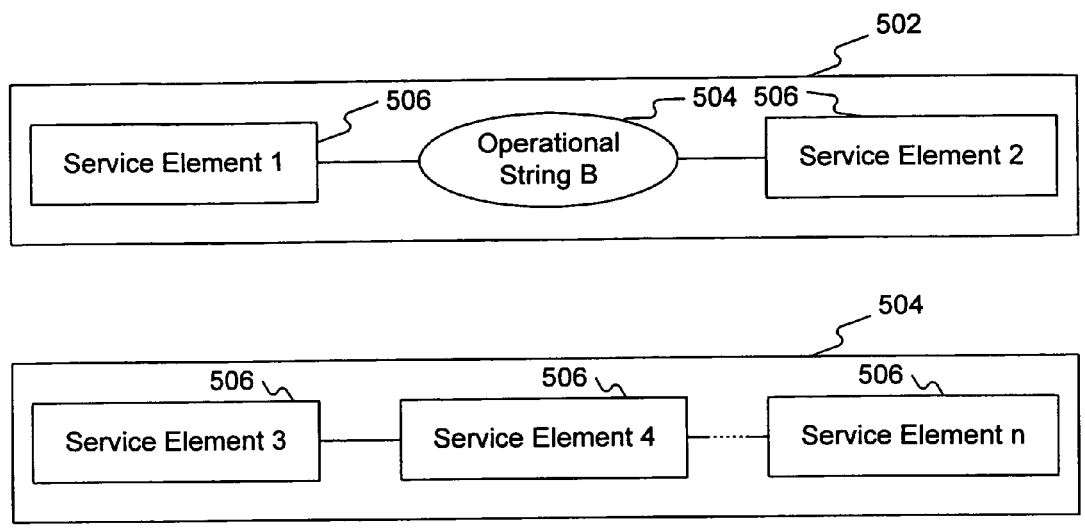
FIG. 5 is a block diagram of an exemplary operational string, in accordance with the present invention.

Consistent with the present invention, a complex service can be represented by an operational string. FIG. 5 depicts a exemplary operational string 502 that includes one or more service elements 506 and another operational string 504. Operational string 504 in turn includes additional service elements 506. For example, operational string 502 might represent the diagnostic monitoring of an automobile. Service element 1 might be diagnostic monitoring of the car's electrical system and service element 2 might be diagnostic monitoring of the car's fluids. Operational string B might be a process to coordinate alerts when one of the monitored systems has a problem. Service element 3 might then be a user interface available to the driver, service element 4 might be a database storing thresholds at which alerts are issued, etc. In an embodiment of the present invention, an operation string can be expressed as an XML document. It will be clear to one of skill in the art that an operational string can contain any number of service elements and operational strings.

Figure 6:
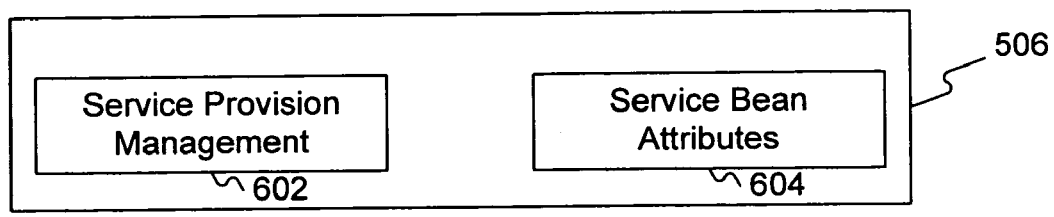
FIG. 6 is a block diagram of an exemplary service element, in accordance with the present invention.

FIG. 6 is a block diagram of a service element in greater detail. A service element contains instructions for creating a corresponding service instance. In one implementation consistent with the present invention, service element 506 includes a service provision management object 602 and a service bean attributes object 604. Service provision management object 602 contains instructions for provisioning and monitoring the service that corresponds to service element 506. For example, if the service is a software application, these instructions may include the requirements of the software application, such as hardware requirements, response time, throughput, etc. Service bean attributes object 604 contains instructions for creating an instance of the service corresponding to service element 506. In one implementation consistent with the present invention, a service instance is referred to as a Jini™ Service Bean (JSB).

C. Jini™ Service Beans

A Jini™ Service Bean (JSB) is a Java™ object that provides a service in a distributed system. As such, a JSB implements one or more remote methods that together constitute the service provided by the JSB. A JSB is defined by an interface that declares each of the JSB's remote methods using Jini™ Remote Method Invocation (RMI) conventions. In addition to its remote methods, a JSB may include a proxy and a user interface consistent with the Jini™ architecture.

Figure 7:
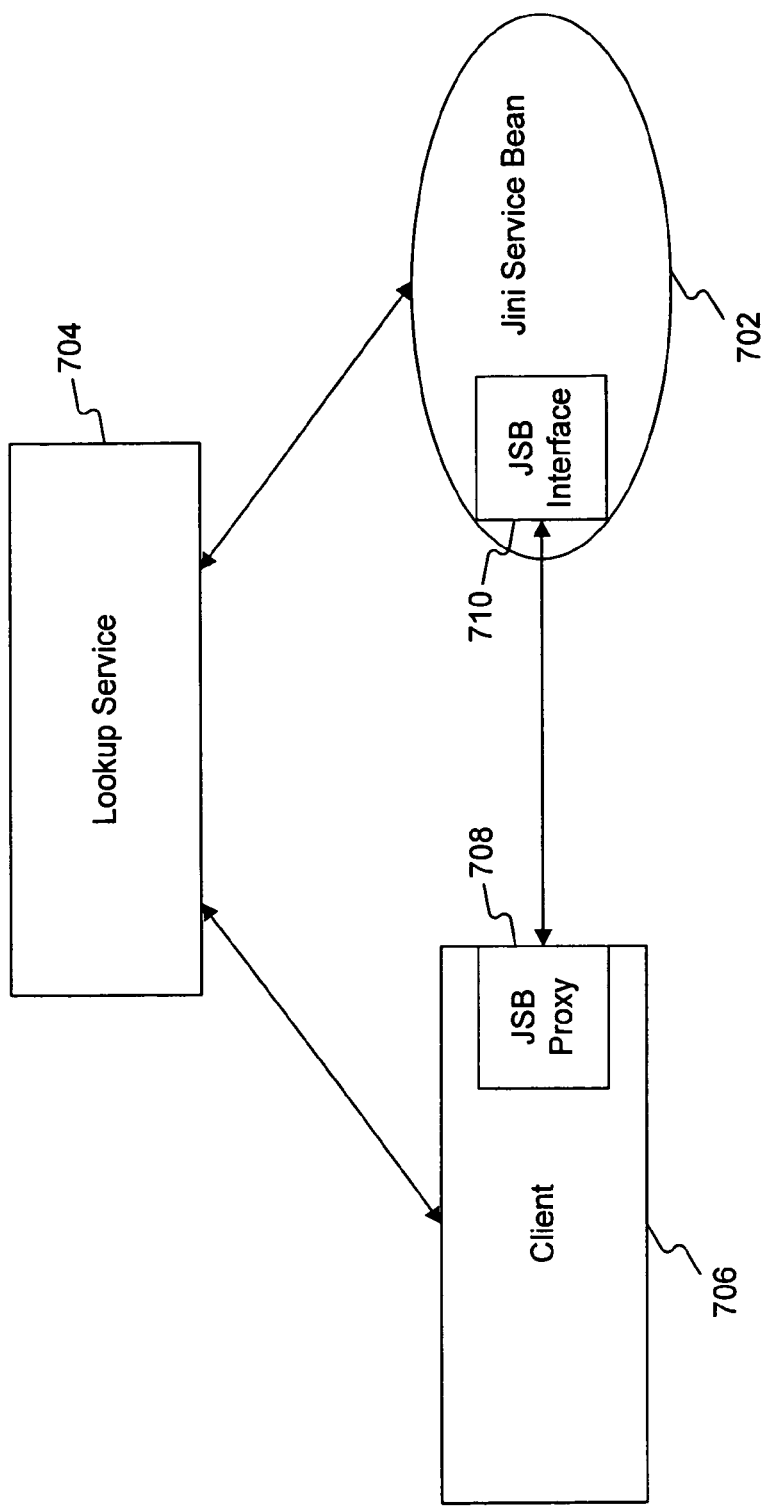
FIG. 7 depicts a block diagram of a system in which a Jini Service Bean (JSB) provides its service to a client, in accordance with the present invention.

FIG. 7 depicts a block diagram of a system in which a JSB provides its service to a client. This system includes a JSB 702, a lookup service 704, and a client 706. When JSB 702 is created, it registers with lookup service 704 to make its service available to others in the distributed system. When a client 706 needs the service provided by JSB 702, client 706 sends a lookup request to lookup service 702 and receives in response a proxy 708 corresponding to JSB 706. Consistent with an implementation of the present invention, a proxy is a Java™ object, and its types (i.e., its interfaces and superclasses) represent its corresponding service. For example, a proxy object for a printer would implement a printer interface. Client 706 then uses JSB proxy 708 to communicate directly with JSB 702 via a JSB interface 710. This communication enables client 706 to obtain the service provided by JSB 702. Client 706 may be, for example, a process running on computer 102, and JSB 702 may be, for example, a process running on device 106.

D. Cybernode Processing

A JSB is created and receives fundamental life-cycle support from an infrastructure service called a "cybernode." A cybernode runs on a compute resource, such as a computer or device. In one embodiment of the present invention, a cybernode runs as a Java™ virtual machine, such as JVM 220, on a computer, such as computer 102. Consistent with the present invention, a compute resource may run any number of cybernodes at a time and a cybernode may support any number of JSBs.

Figure 8:
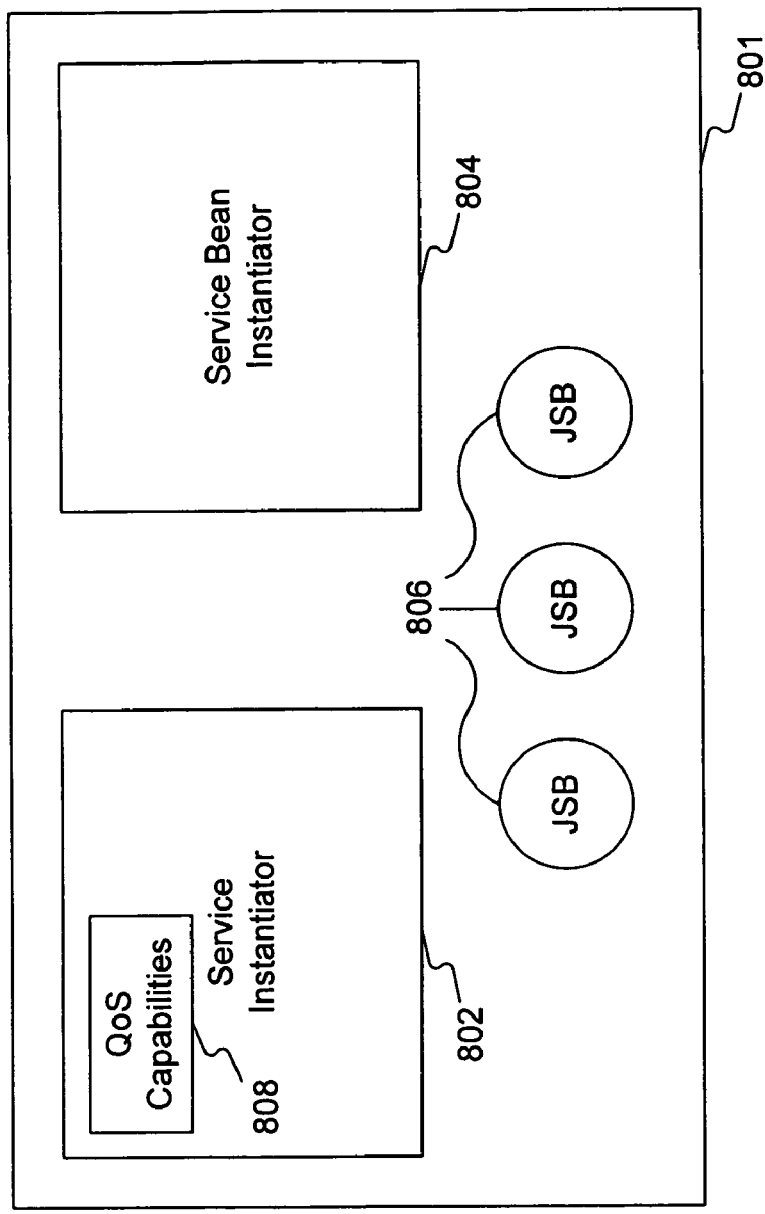
FIG. 8 depicts a block diagram of a cybernode in accordance with the present invention.

FIG. 8 depicts a block diagram of a cybernode. Cybernode 801 includes service instantiator 802 and service bean instantiator 804. Cybernode 801 may also include one or more JSBs 806 and one or more quality of service (QoS) capabilities 808. QoS capabilities 808 represent the capabilities, such as CPU speed, disk space, connectivity capability, bandwidth, etc., of the compute resource on which cybernode 801 runs.

Service instantiator object 802 is used by cybernode 801 to register its availability to support JSBs and to receive requests to instantiate JSBs. For example, using the Jini™ event handling process, service instantiator object 802 can register interest in receiving service provision events from a service provisioner, discussed below. A service provision event is typically a request to create a JSB. The registration process might include declaring QoS capabilities 808 to the service provisioner. These capabilities can be used by the service provisioner to determine what compute resource, and therefore what cybernode, should instantiate a particular JSB, as described in greater detail below. In some instances, when a compute resource is initiated, its capabilities are declared to the cybernode 801 running on the compute resource and stored as QoS capabilities 808.

Service bean instantiator object 804 is used by cybernode 801 to create JSBs 806 when service bean instantiator object 804 receives a service provision event. Using JSB attributes contained in the service provision event, cybernode 801 instantiates the JSB, and ensures that the JSB and its corresponding service remain available over the network. Service bean instantiator object 804 can be used by cybernode 801 to download JSB class files from a code server as needed.

Figure 9:
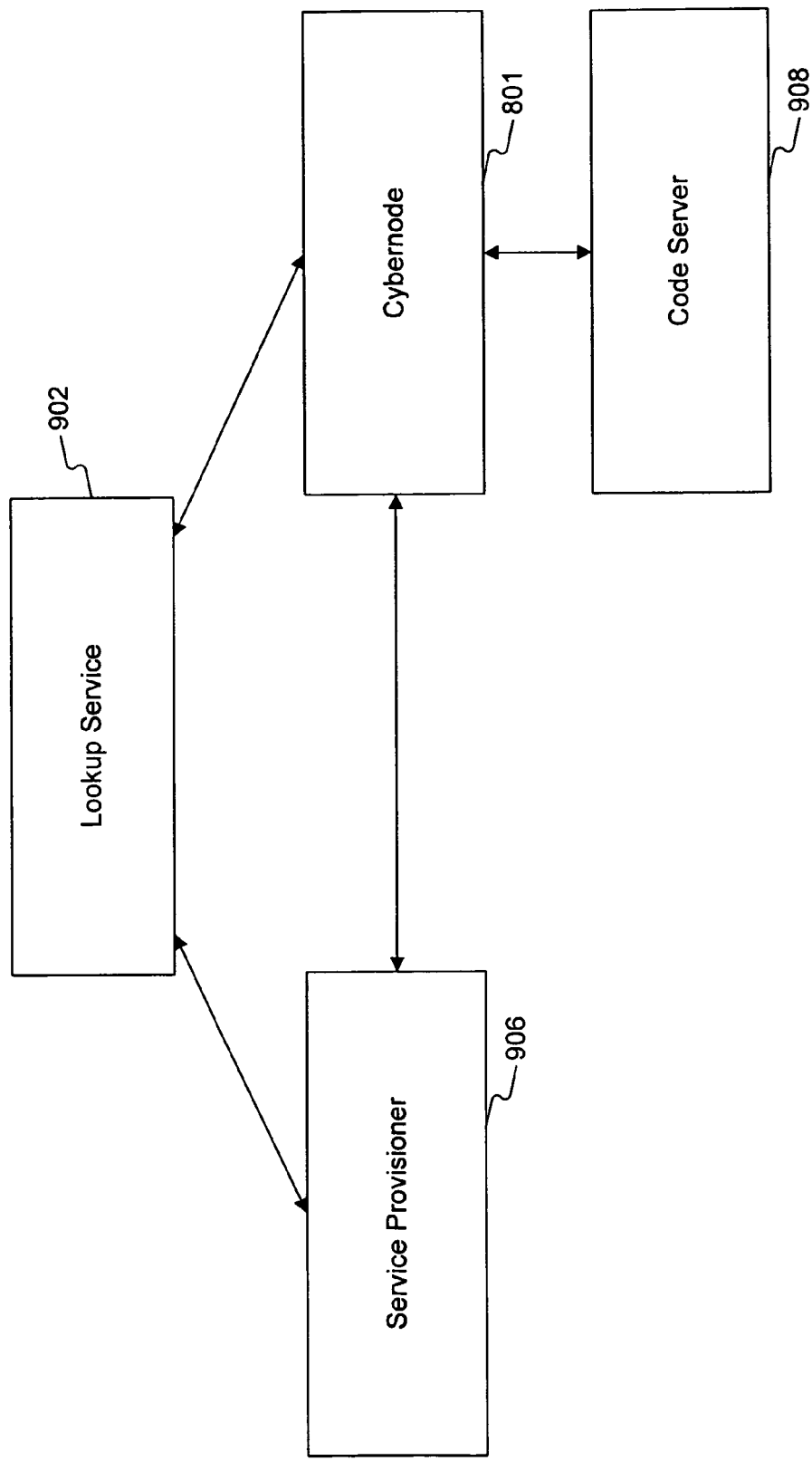
FIG. 9 depicts a block diagram of a system in which a cybernode interacts with a service provisioner, in accordance with the present invention.

FIG. 9 depicts a block diagram of a system in which a cybernode interacts with a service provisioner. This system includes a lookup service 902, a cybernode 801, a service provisioner 906, and a code server 908. As described above, cybernode 801 is an infrastructure service that supports one or more JSBs. Cybernode 801 uses lookup service 902 to make its services (i.e., the instantiation and support of JSBs) available over the distributed system. When a member of the distributed system, such as service provisioner 906, needs to have a JSB created, it discovers cybernode 801 via lookup service 902. In its lookup request, service provisioner 906 may specify a certain capability that the cybernode should have. In response to its lookup request, service provisioner 906 receives a proxy from lookup service 902 that enables direct communication with cybernode 801.

Figure 10:
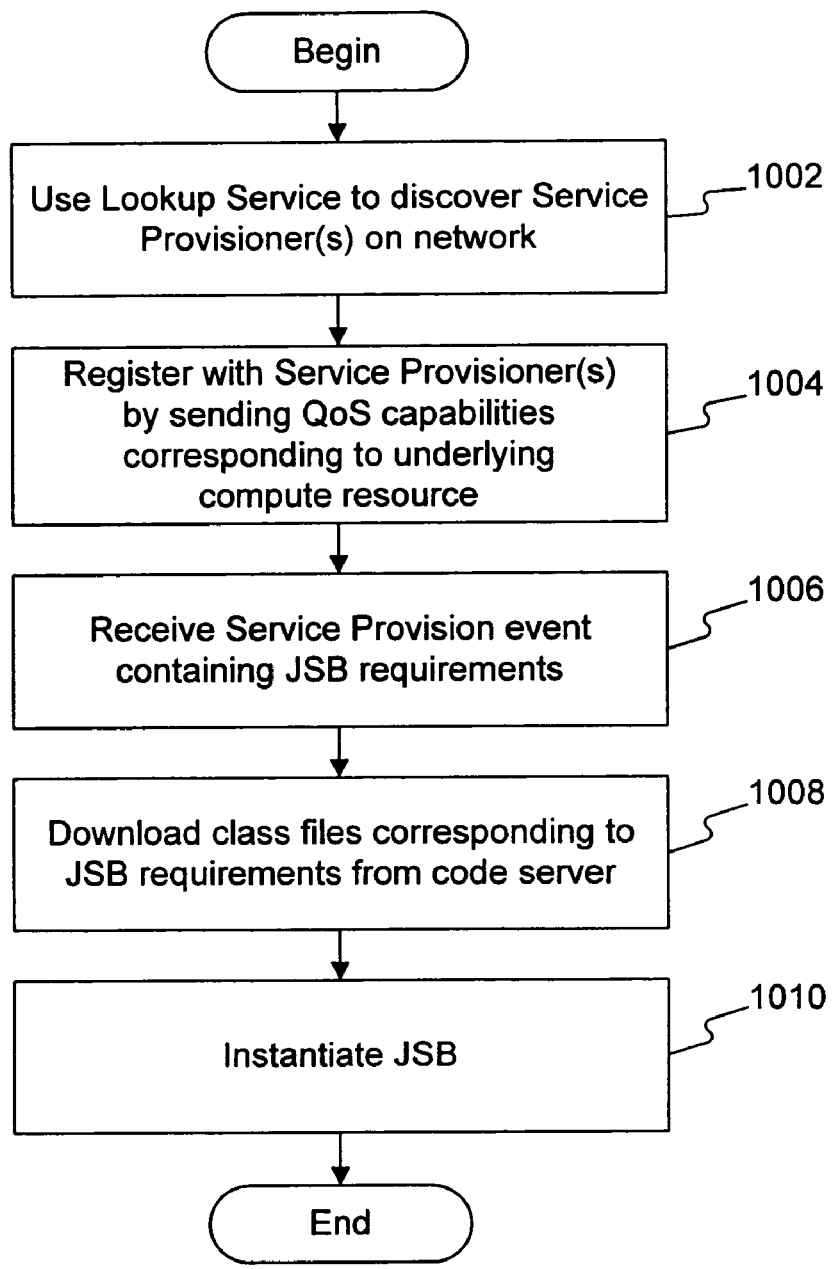
FIG. 10 is a flow chart of Jini Service Bean (JSB) creation performed by a cybernode, in accordance with the present invention.

FIG. 10 is a flow chart of JSB creation performed by a cybernode. A cybernode, such as cybernode 801, uses lookup service 902 to discover one or more service provisioners 906 on the network (step 1002). Cybernode 801 then registers with service provisioners 906 by declaring the QoS capabilities corresponding to the underlying compute resource of cybernode 801 (step 1004). When cybernode 801 receives a service provision event containing JSB requirements from service provisioner 906 (step 1006), cybernode 801 may download class files corresponding to the JSB requirements from code server 908 (step 1008). Code server 908 may be, for example, an HTTP server. Cybernode 801 then instantiates the JSB (step 1010).

As described above, JSBs and cybernodes comprise the basic tools to provide a service corresponding to a service element in an operational string consistent with the present invention. A service provisioner for managing the operational string itself will now be described.

E. Dynamic Service Provisioning

A service provisioner is an infrastructure service that provides the capability to deploy and monitor operational strings. As described above, an operational string is a collection of service elements that together constitute a complex service in a distributed system. To manage an operational string, a service provisioner determines whether a service instance corresponding to each service element in the operational string is running on the network. The service provisioner dynamically provisions an instance of any service element not represented on the network. The service provisioner also monitors the service instance corresponding to each service element in the operational string to ensure that the complex service represented by the operational string is provided correctly.

Figure 11:
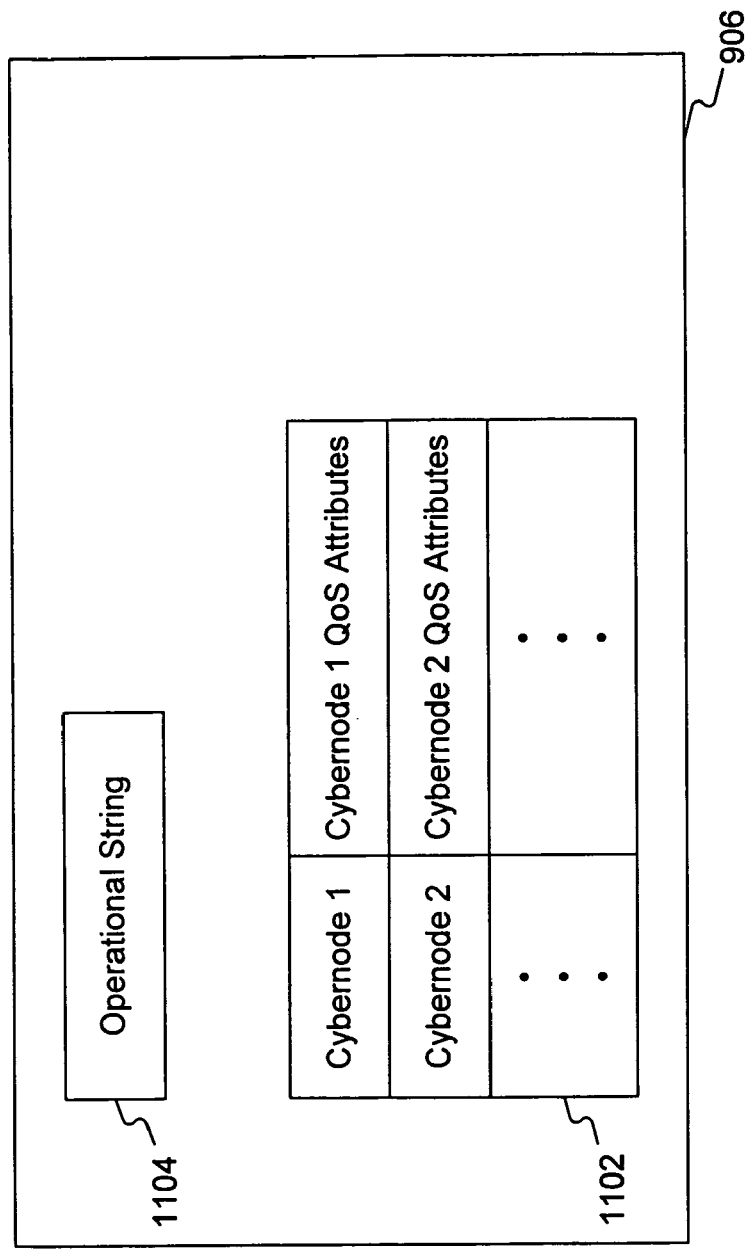
FIG. 11 is a block diagram of a service provisioner in greater detail, in accordance with the present invention.

FIG. 11 is a block diagram of a service provisioner in greater detail. Service provisioner 906 includes a list 1102 of available cybernodes running in the distributed system. For each available cybernode, the QoS attributes of its underlying compute resource are stored in list 1102. For example, if an available cybernode runs on a computer, then the QoS attributes stored in list 1102 might include the computer's CPU speed or storage capacity. Service provisioner 406 also includes one or more operational strings 1104.

Figure 12:
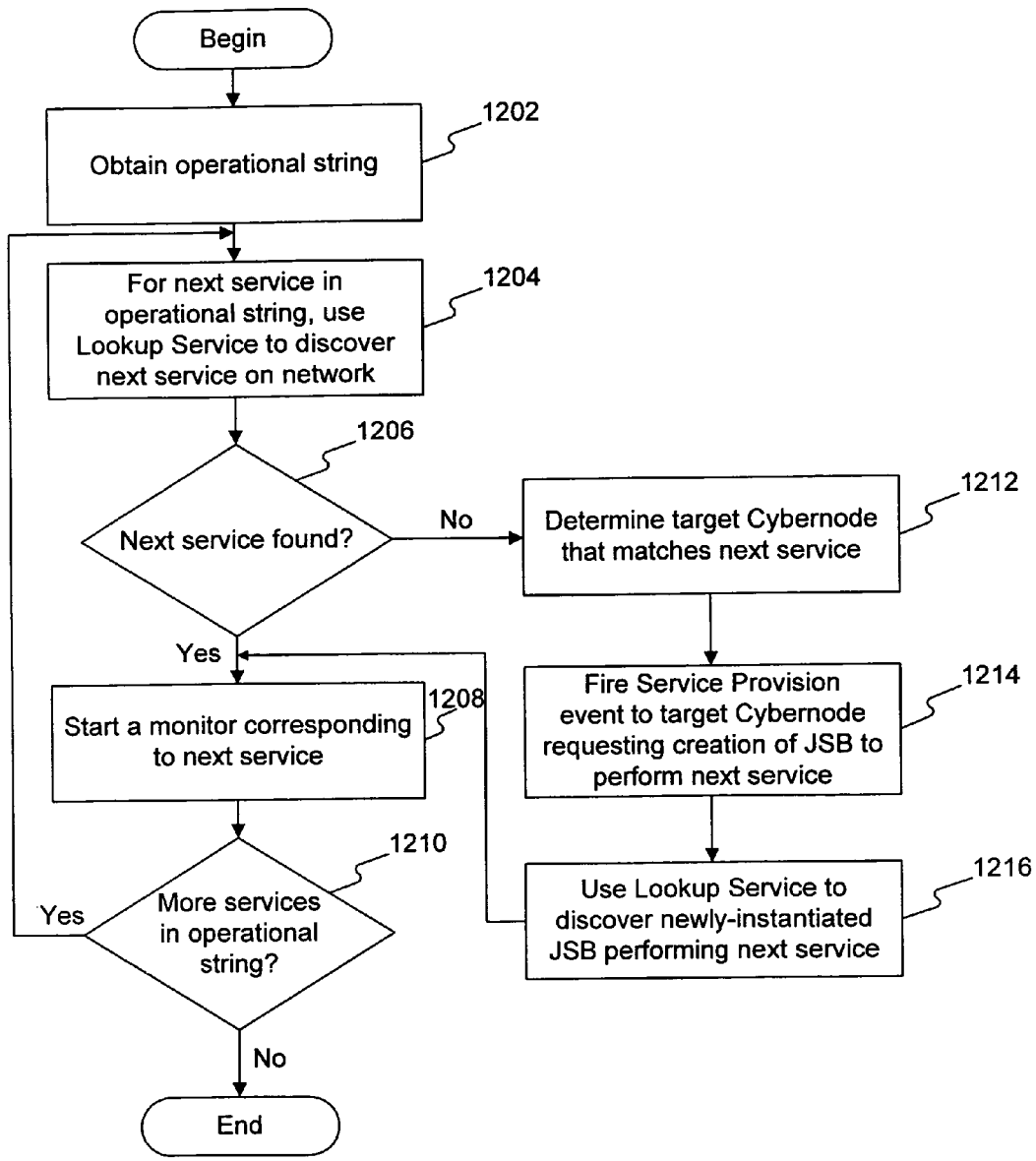
FIG. 12 is a flow chart of dynamic provisioning performed by a service provisioner, in accordance with the present invention.

FIG. 12 is a flow chart of dynamic provisioning performed by a service provisioner. Service provisioner 906 obtains an operational string consisting of any number of service elements (step 1202). The operational string may be, for example, operational string 502 or 504. Service provisioner 906 may obtain the operational string from, for example, a programmer wishing to establish a new service in a distributed system. For the first service in the operational string, service provisioner 906 uses a lookup service, such as lookup service 902, to discover whether an instance of the first service is running on the network (step 1204). If an instance of the first service is running on the network (step 1206), then service provisioner 906 starts a monitor corresponding to that service element (step 1208). The monitor detects, for example, when a service instance fails. If there are more services in the operational string (step 1210), then the process is repeated for the next service in the operational string.

If an instance of the next service is not running on the network (step then service provisioner 906 determines a target cybernode that matches the next service (step 1212). The process of matching a service instance to a cybernode is discussed below. Service provisioner 906 fires a service provision event to the target cybernode requesting creation of a JSB to perform the next service (step 1214). In one embodiment, the service provision event includes service bean attributes object 604 from service element 506. Service provisioner 906 then uses a lookup service to discover the newly instantiated JSB (step 1216) and starts a monitor corresponding to that JSB (step 1208).

As described above, once a service instance is running, service provisioner 906 monitors it and directs its recovery if the service instance fails for any reason. For example, if a monitor detects that a service instance has failed, service provisioner 906 may issue a new service provision event to create a new JSB to provide the corresponding service. In one embodiment of the present invention, service provisioner 906 can monitor services that are provided by objects other than JSBs. The service provisioner therefore provides the ability to deal with damaged or failed resources while supporting a complex service.

Service provisioner 906 also ensures quality of service by distributing a service provision request to the compute resource best matched to the requirements of the service element. A service, such as a software component, has requirements, such as hardware requirements, response time, throughput, etc. In one embodiment of the present invention, a software component provides a specification of its requirements as part of its configuration. These requirements are embodied in service provision management object 602 of the corresponding service element. A compute resource may be, for example, a computer or a device, with capabilities such as CPU speed, disk space, connectivity capability, bandwidth, etc.

In one implementation consistent with the present invention, the matching of software component to compute resource follows the semantics of the Class.isAssignable( ) method, a known method in the Java™ programming language. If the class or interface represented by QoS class object of the software component is either the same as, or is a superclass or superinterface of, the class or interface represented by the class parameter of the QoS class object of the compute resource, then a cybernode resident on the compute resource is invoked to instantiate a JSB for the software component. Consistent with the present invention, additional analysis of the compute resource may be performed before the "match" is complete. For example, further analysis may be conducted to determine the compute resource's capability to process an increased load or adhere to service level agreements required by the software component.

F. Enhanced Event Handling

Systems consistent with the present invention may expand upon traditional Jini™ event handling by employing flexible dispatch mechanisms selected by an event producer. When more than one event consumer has registered interest in an event, the event producer can use any policy it chooses for determining the order in which it notifies the event consumers. The notification policy can be, for example, round robin notification, in which the event consumers are notified in the order in which they registered interest in an event, beginning with the first event consumer that registered interest. For the next event notification, the round robin notification will begin with the second event consumer in the list and proceed in the same manner. Alternatively, an event producer could select a random order for notification, or it could reverse the order of notification with each event.

As described above, in an embodiment of the present invention, a service provisioner is an event producer and cybernodes register with it as event consumers. When the service provisioner needs to have a JSB instantiated to complete an operational string, the service provisioner fires a service provision event to all of the cybernodes that have registered, using an event notification scheme of its choosing.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems.

Furthermore, one skilled in the art would recognize the ability to implement the present invention in many different situations. For example, the present invention can be applied to the telecommunications industry. A complex service, such as a telecommunications customer support system, may be represented as a collection of service elements such as customer service phone lines, routers to route calls to the appropriate customer service entity, and billing for customer services provided. The present invention could also be applied to the defense industry. A complex system, such as a battleship's communications system when planning an attack, may be represented as a collection of service elements including external communications, weapons control, and vessel control.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for providing services in a distributed system, comprising:
   receiving capabilities of a compute resource from an executable application on the compute resource;
   receiving a request to add a new service to the distributed system, including information reflecting requirements of the new service;
   determining whether an instance of the new service was previously instantiated and is currently operating in the distributed system;
   monitoring operation of the previously instantiated instance of the new service to determine whether the previously instantiated instance fails;
   matching the requirements of the new service to the capabilities of the compute resource if the new service was determined in the determining step to not currently be operating in the distributed system or if the monitoring determines the previously instantiated instance of the new service fails; and
   when the matching determines the requirements of the new service match the capabilities of the compute resource, directing the executable application running on the compute resource to instantiate an instance of the new service.

2. The method of claim 1, wherein the request further includes attributes of the new service and the directing further comprises:
   sending the attributes of the new service to the compute resource.

3. The method of claim 1, wherein the compute resource is a Java™ virtual machine.

4. A system for providing services in a distributed system, comprising:
   a memory
   a capabilities receiving component configured to receive capabilities of a compute resource from an executable application on the compute resource;
   a request receiving component configured to receive a request to add a new service to the distributed system, including information reflecting requirements of the new service for computer resource capabilities associated with instantiation;
   a service operation component which determines if an instance of the new service is currently operating in the distributed system;
   a service monitoring component which monitors the operation of the instance of the new service if the new service is currently operating in the distributed system;
   a matching component configured to match the requirements of the new service to the capabilities of the compute resource when the new service is determined to not be currently operating in the distributed system by the service operation component or when the service monitoring component determines the operation of the instance has failed; and
   a directing component configured to direct the executable application running on the compute resource to instantiate the new service.

5. The system of claim 4, wherein the request further includes attributes of the new service and the directing component further comprises: a sending component configured to send the attributes of the new service to the compute resource.

6. The system of claim 4, wherein the compute resource is a Java ™ virtual machine.

* * * * *